(12) United States Patent
Funke, III et al.

(10) Patent No.: US 7,740,318 B2
(45) Date of Patent: Jun. 22, 2010

(54) BABY HEAD SLEEPING SUPPORT SYSTEM FOR CAR SEAT

(76) Inventors: William Funke, III, 8 Goosetown Rd., Clinton, NJ (US) 08809; Heidi Funke, 8 Goosetown Rd., Clinton, NJ (US) 08809

( * ) Notice: Subject to any disclaimer, the term of this patent is extended or adjusted under 35 U.S.C. 154(b) by 145 days.

(21) Appl. No.: 10/930,363

(22) Filed: Aug. 30, 2004

(65) Prior Publication Data

US 2006/0061186 A1 Mar. 23, 2006

(51) Int. Cl.
*A47C 7/38* (2006.01)
(52) U.S. Cl. ......................................... 297/393
(58) Field of Classification Search .............. 297/393, 297/392; 482/74, 126; 5/636
See application file for complete search history.

(56) References Cited

U.S. PATENT DOCUMENTS

| | | | | |
|---|---|---|---|---|
| 2,267,103 A | 12/1941 | Ireland | ......................... | 155/177 |
| 2,582,571 A | 1/1952 | Thoma | ......................... | 155/174 |
| 2,726,714 A | 12/1955 | McAndrews | ................. | 155/189 |
| 3,606,885 A | 9/1971 | Lund | ........................... | 128/134 |
| 4,024,861 A | 5/1977 | Vincent | ......................... | 128/87 |
| 4,335,875 A * | 6/1982 | Elkin | ......................... | 482/74 X |
| 4,339,151 A | 7/1982 | Riggs | ........................... | 297/464 |
| 4,607,885 A | 8/1986 | Del Fierro | .................... | 297/397 |
| 4,707,031 A | 11/1987 | Meistrell | ...................... | 297/393 |
| 5,076,264 A | 12/1991 | Lonardo et al. | ................ | 128/78 |
| D339,428 S | 9/1993 | Swinea et al. | ................. | D29/17 |
| 5,360,393 A | 11/1994 | Garth et al. | ..................... | 602/17 |
| 5,378,042 A | 1/1995 | Daneshvar | .................... | 297/393 |
| 5,395,158 A | 3/1995 | Cordia | ......................... | 297/393 |
| 5,511,854 A | 4/1996 | Cordia | ......................... | 297/393 |
| 5,681,248 A * | 10/1997 | Vani | ............................ | 482/126 |
| 6,209,959 B1 | 4/2001 | Meye | ......................... | 297/393 |
| 6,266,825 B1 | 7/2001 | Floyd | ............................ | 2/338 |
| 6,301,716 B1 | 10/2001 | Ross | ............................ | 2/171 |
| 6,607,245 B1 | 8/2003 | Scher | ......................... | 297/393 |
| 6,957,462 B1 * | 10/2005 | Wilcox | ....................... | 297/393 |
| 2004/0124685 A1 * | 7/2004 | Buch | ....................... | 297/393 X |

* cited by examiner

*Primary Examiner*—Anthony D Barfield
(74) *Attorney, Agent, or Firm*—Ernest D. Buff & Associates LLC; Ernest D. Buff; Harry Anagnostopoulos

(57) ABSTRACT

A padded strap is attached to both sides of a child car seat using two sets of hook and loop type fasteners, and alternatively, through use of two rotating discs. A child car seat head support system is thereby provided, which holds a baby's head in a comfortable, upright position while sleeping in a forward facing car seat. Stabilized support is accomplished using the padded strap to gently hold the child's head in an upright position against the back of the child's car seat. The support mechanism prevents the child's head from falling forward or "rolling" to the left or right side while the child is asleep. In an alternative embodiment, the padded strap is attached at both free ends to a tension strap with two sets of fasteners, respectively; thereby forming a single, circular strap, operable for placement over the top of the car seat. The circular strap is held in position by the tension force applied by the elastic material of the padded strap, and the resulting friction applied between the circular strap and the outside of the car seat. The circumference of the circular strap may be adjusted with the two sets of fasteners, preferably hook and loop type, to accommodate various car seats, strollers, booster seats, and the like.

11 Claims, 4 Drawing Sheets

BABY HEAD SLEEPING SUPPORT SYSTEM FOR CAR SEAT

BACKGROUND OF THE INVENTION

1. Field of the Invention

The present invention relates to the field of child car seats, strollers, booster seats, and the like; and more particularly to a baby head sleeping support system for the same.

2. Description of the Prior Art

Restful sleep is important for human beings, and even more so for young children and babies. Many times the motions experienced while riding in a vehicle promote the desire to fall asleep; this is especially evident with babies. Some parents even deliberately employ this phenomena to encourage their children to fall asleep, by placing their child in a car seat and driving around until the child falls asleep. Indeed, when babies are riding in a vehicle car seat, they typically spend a lot of hours sleeping. During sleep, however, the muscles in the neck and back of the human body that normally support the head do not function. This is magnified in babies as their neck and back muscles are not as strong as those of an adult. The result is that when babies are asleep in a car seat, their head will fall forward or "roll" to the left or right, placing strain on the baby's neck and spine and causing discomfort that diminishes the quality of sleep that the child enjoys. While driving in and around city streets, the forces associated with vehicle acceleration, braking, and sharp turns, respectively, further magnify the harmful effects on the neck and spine caused by the child's head not being supported.

Head supports for adults and children are known in the art. However, the prior art lacks the salient features and advantages of the present invention as described herein. Moreover, many of the prior art patents disclose apparatus specifically designed for adult seats. Others require several parts, involve intricate installation, are incapable of being readily adjusted to accommodate for various size heads, and are bulky in terms of their size and weight. The following is a summary of the relevant prior art.

U.S. Pat. No. 2,267,103 to Ireland discloses a head support for various types of vehicles employed for the transportation of persons. The head support is especially adaptable for use by persons who are traveling for long distances and desire to relax and rest. The '103 patent teaches an apparatus intended for an adult seat. No disclosure is contained therein concerning a child car seat head support having a soft cotton head pad that is tubular in design, wherein a support band is inserted through the head pad and is attached to the car seat by two hook and loop type fastener strips.

U.S. Pat. No. 2,582,571 to Thoma discloses a headrest comprising a pair of cushions which are arranged in spaced-apart relation with one another for the reception of a person's head therebetween. The cushions are mounted on a band that is designed to encircle the back of a seat in a bus, train, or the like. The band may be adjusted with respect to the back so that the cushions will embrace opposite sides of the person's head and cover the latter's ears. The '571 patent teaches an apparatus intended for an adult seat. Furthermore, the '571 patent does not comprise a child car seat head support having a soft cotton head pad that is tubular in design, wherein a support band is inserted through the head pad and is attached to the car seat by two hook and loop type fastener strips, such that the support strap completely surrounds the child's head.

U.S. Pat. No. 2,726,714 to McAndrews discloses an infant restraining means for automobile use. The '714 patent comprises a strap which fits around the back of an automobile seat and a belt mounted on the strap, the belt being adjustable to fit around the abdomen of an infant. The '714 patent does not teach an apparatus that is used with a modern forward-facing child car seat. Furthermore, the '714 patent does not comprise a child car seat head support having a soft cotton head pad that is tubular in design, wherein a support band is inserted through the head pad and is attached to the car seat by two hook and loop type fastener strips, such that the support strap covers the child's forehead.

U.S. Pat. No. 3,606,885 to Lund discloses an infant holder of a preformed unitary plastic body by which an infant can be supported either in a relatively fixed supine position or in a suspended upright position for the making of an X-ray or other treatment or operation, and which not only will not interfere with the X-ray but will stand sterilization. The '885 patent does not disclose an apparatus that can be used with a modern forward-facing child car seat during vehicle operation. Furthermore, the '885 patent does not comprise a child car seat head support having a soft cotton head pad that is tubular in design, wherein a support band is inserted through the head pad and is attached to the car seat by two hook and loop type fastener strips.

U.S. Pat. No. 4,024,861 to Vincent discloses a spinal support, particularly for use in first aid treatment of victims of spinal injuries. The support is of the type of an inflatable bag to which the victim is secured to immobilize his or her spine during transportation to a hospital or the like. Fixedly secured to the sides of the head portion are head straps arranged for securing the victim's head to the support. The straps are secured to the head portion by welding or the like in proximity to the peripheral seam. The '861 patent does not disclose an apparatus that is used with a modern forward-facing child car seat during vehicle operation. Furthermore, the '861 patent does not comprise a child car seat head support having a soft cotton head pad that is tubular in design, wherein a support band is inserted through the head pad and is attached to the car seat by two hook and loop type fastener strips.

U.S. Pat. No. 4,339,151 to Riggs discloses a head restraint for supporting the user's head while seated in a chair. The head restraint comprises a strap adapted to be wrapped around the back of a chair and an adjustable headband secured to a central forward portion of the strap. The head restraint is preferably made of paper and is readily disposable after use. The '151 patent does not disclose an apparatus that is used with a modern forward-facing child car seat during vehicle operation. Furthermore, the '151 patent does not comprise a child car seat head support having a soft cotton head pad that is tubular in design, wherein a durable support band is inserted through the head pad and is attached to the car seat by two hook and loop type fastener strips.

U.S. Pat. No. 4,607,885 to del Fierro discloses a head-restraining device for preventing possibly injurious forward and lateral motion of the head of a child seated in a child's seat. The device comprises a rigid U-shaped restraining member which surrounds the forward and lateral portions of the child's head, and is of a size to be separated therefrom by a slight air gap so as to not be uncomfortable, yet be capable of being engaged by the child's head and restraining such from any more than minimal forward and lateral motion. The device disclosed by the '885 patent is bulky in size and is not easily adjusted to accommodate for various sized heads of children. The head restraint is not flexible and does not tightly secure the child's head, since the apparatus in the '885 patent is designed to be installed such that a gap exists between the child's head and the support system. The '885 patent does not comprise a child car seat head support having a soft cotton head pad that is tubular in design, wherein an elastic support band is inserted through the head pad and is attached to the car seat by two hook and loop type fastener strips.

U.S. Pat. No. 4,707,031 to Meistrell discloses a head support for a traveler sitting in a chair having a headrest, and which includes a first band adapted to be fitted in adjustably wrapped condition closely about the user's head and at eye or forehead level, a band retention structure associated with the band for retaining the band in said wrapped condition, and a head restraint structure coupled to the band and adapted to be coupled to the headrest for restraining the user's head against lateral side-to-side movement relative to the headrest. Installation of the '031 requires several steps, and the apparatus contains several parts. In addition, the '031 patent does not allow for adjustments to accommodate various size heads because the band placed over the front of the car seat does not use a hook and loop type fastener to attach to the car seat, but instead uses snaps. The '031 patent does not comprise a child car seat head support having a soft cotton head pad that is tubular in design, wherein an elastic support band is inserted through the head pad and is attached to the car seat by two hook and loop type fastener strips.

U.S. Pat. No. 5,076,264 to Lonardo et al. discloses a medical appliance, having a thick foam core received within a cover made of fleece, for simultaneously treating spinal, shoulder girdle, head, neck and related conditions. The appliance includes a seat cushion surrounded on three sides by a three-sided vest having a back wall and a pair of forwardly extending sidewalls. The '264 patent teaches a medical appliance and is not an apparatus that can be used with a modern forward-facing child car seat during vehicle operation. Furthermore, the '264 patent does not comprise a child car seat head support having a soft cotton head pad that is tubular in design, wherein a support band is inserted through the head pad and is attached to the car seat by two hook and loop type fastener strips, such that the support strap completely surrounds the child's head.

U.S. Pat. No. 5,360,393 to Garth et al. discloses a dual adhesive strap which is designed to lay across and adhere to the patient's forehead and have each of its ends adhere to a spine board for securing a patient's head in a head immobilizer. The strap has a bottom side comprising a central region which comprises skin contact adhesive flanked by two regions which comprise a board contact adhesive. The '393 patent teaches a medical appliance and is not an apparatus that can be used with a modern forward-facing child car seat during vehicle operation. Furthermore, the '393 patent does not comprise a child car seat head support having a soft cotton head pad that is tubular in design, wherein a support band is inserted through the head pad and is attached to the car seat by two hook and loop type fastener strips, such that the cotton head pad rests on the child's forehead, but is not adhered to same.

U.S. Pat. No. 5,378,042 to Daneshvar discloses a device which is adapted to support the head of a seated user relative to a generally upstanding portion of a seat, stroller, or the like, and has a strap adapted to encircle the head of the user and the generally upstanding portion. The strap contains a plurality of inflatable balloons having generally flat rear surfaces and expandable frontal surfaces, whereby upon inflation the generally flat rear surfaces of the balloons remain flat, and the frontal surfaces bulge outwardly from the rear surfaces to contact and support the user's head. Such balloons may require manual inflation and are generally not reliable for long term use. The '042 patent does not teach an apparatus that can be used with a modern forward-facing child car seat during vehicle operation. Furthermore, the '393 patent does not comprise a child car seat head support having a soft cotton head pad that is tubular in design, wherein a support band is inserted through the head pad and is attached to the car seat by two hook and loop type fastener strips.

U.S. Pat. Nos. 5,395,158 and 5,511,854 to Cordia disclose a head support and feeding aid for a wheelchair patient whose head slumps forwardly when seated. A headband is attached to a frame on the wheelchair seat back by adjustable cords. By progressively adjusting the length of the cords, the head band progressively lifts the patient's head to a more and more upright position. The length of the cords is adjusted by releasable cord clamps behind the frame. The '158 and '854 patents teach a medical appliance and not an apparatus that can be used with a modern forward-facing child car seat during vehicle operation. Furthermore, the '158 and '854 patents do not comprise a child car seat head support having a soft cotton head pad that is tubular in design, wherein a support band is inserted through the head pad and is attached to the car seat by two hook and loop type fastener strips.

U.S. Pat. No. 6,209,959 to Meye discloses a headrest to be used in vehicles and provided with fastening means for a headband to be positioned around the head of a passenger above the eyes and ears. The fastening means comprise a ring suitable for the headband to be passed through. The fastening means comprise a band attached in the interior of the headrest, which extends through an opening in the upholstery, and the ring is fastened to the band at the exterior of the headrest. The '959 patent teaches a headrest for use with an adult seat and not with a modern forward-facing child car seat. Furthermore, the '959 patent does not comprise a child car seat head support having a soft cotton head pad that is tubular in design, wherein a support band is inserted through the head pad and is attached to the car seat by two hook and loop type fastener strips.

U.S. Pat. No. 6,266,825 to Floyd discloses a traveler's head support sleeping and resting mechanism for a seated person. The seat and/or chair being used may include a headrest. The '825 patent discloses a harness comprised from a band of a two strap assembly arrangement with highly adhesive contact surfaces which may be a hook and loop mechanism, whereby the two lengths of strap are contacted to form one length only. The seat harness and the head harness are preferably made of non-resilient material such as nylon-type webbing. The '825 patent does not disclose a head support having an elastic support band which is inserted through a tubular head pad and is attached to the car seat by two hook and loop type fastener strips. The elastic nature of a support band will act to absorb any forces on the child's head encountered during vehicle operation; an elastic support band is easy to secure about the child's forehead, and is comfortable for the child.

U.S. Pat. No. 6,301,716 to Ross discloses a head support assembly to facilitate the care of a physically disabled individual. The head support assembly includes a headpiece and an attachment cord attached to the headpiece which is adapted to be attached to a chair. The attachment cord and headpiece provide resilient support for an individual's head to facilitate the care of the individual. The '716 patent teaches a medical appliance and not an apparatus that can be used with a modern forward-facing child car seat during vehicle operation. Furthermore, the '716 patent does not comprise a child car seat head support having a soft cotton head pad that is tubular in design, wherein a support band is inserted through the head pad and is attached to the car seat by two hook and loop type fastener strips.

U.S. Pat. No. 6,607,245 to Scher discloses a head restraint for supporting a user's head with respect to the headrest portion of a seat. The head restraint has a headband strap for placing over the head across the forehead of the user. An anchor band is secured around the headrest portion of the seat. A right-hand securement strap is affixed between the strap placed over the head of the user and the anchor band. Similarly, a left-hand strap is affixed between the strap placed over the head of the user and the anchor band. The '245 patent requires three separate straps, which increases the cost of the product, and make it more difficult to install than a device with a single support strap. The '716 patent does not comprise a child car seat head support having a soft cotton head pad that is tubular in design, wherein a single support band is inserted through the head pad and is attached to the car seat.

U.S. Pat. Des. 339,428 to Swinea et al. discloses an ornamental design for a head restraint strap. The '428 patent does not comprise a child car seat head support having a soft cotton head pad that is tubular in design, wherein a single support band is inserted through the head pad and is attached to the car seat by two hook and loop type fastener strips.

There remains a need in the art for a baby head sleeping support system comprising an apparatus having a padded strap that is attached to both sides of the car seat with two hook and loop type fasteners. Also needed is a baby head sleeping support system wherein the padded strap has a circular configuration that facilitates its operation with a wide variety of car seats. Such a device is found in the present invention which solves the problems associated with the lack of support of a baby's head while sleeping in a vehicle's child car seat. The baby head sleeping support system of the present invention provides a safe, comfortable, simple, compact and reliable apparatus for properly securing a child's head against the rear of a child car seat when the child is asleep.

SUMMARY OF THE INVENTION

The present invention provides a baby head sleeping support system for a child car seat comprising (i) an elastic, one-piece support band having a first end and a second end; (ii) a soft head pad that rests against the child's forehead during use of the support system, the head pad being tubular in design to allow the support band to pass through it; and (iii) two sets of fasteners, the fasteners being placed on either side of the car seat and at the ends of the support band, respectively, wherein the support band is passed through the head pad, and the support band is attached to the car seat with the fasteners to support the child's head in an upright position against the back of the car seat.

In another embodiment of the present invention there is provided a baby head sleeping support system for a child car seat, comprising (i) an elastic, one-piece support band having a first end and a second end; (ii) a soft head pad that rests against the child's forehead during use of the support system, the head pad being tubular in design to allow the support band to pass through it; (iii) a substantially non-elastic tension strap having a first end and a second end; (iv) a first ring at the first end of the support band for attaching the support band's first end to said strap's first end; (v) a second ring at the second end of the support band for attaching the support band's second end to the strap's second end; and (vi) two sets of fasteners being placed on either end of the tension strap, respectively, such that each of the ends are inserted through each of the rings, respectively, and each end is folded onto itself, creating a removable attachment of each of the support band's first and second ends, respectively, to each of the strap's first and second ends, respectively. In this embodiment the support band is passed through the head pad. A first end of the support band is removably attached to the tension strap's first end and a second end of the support band is removably attached to the tension strap's second end. In this manner there is formed a single circular strap having a circumference. Advantageously, the circular strap is readily placed over the car seat and tightened against the car seat with the fasteners so that the head pad rests against the child's forehead and the child's head is supported in an upright position against the back of the car seat,.

The present invention solves the problems associated with the lack of support of a baby's head while sleeping in a child car seat in a vehicle. The details of construction and arrangement of parts will be seen from the following description of the preferred embodiments and from the appended claims when considered with the attached drawings.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

The baby head sleeping support system of the current invention comprises an apparatus having a padded strap that is attached to both sides of the car seat with two fasteners, preferably hook and loop type, and alternately is attached to two rotating discs. The system maintains a baby's head in a comfortable, upright position while sleeping in a forward facing car seat.

The head support system comprises a support band, which is preferably held in place by two hook and loop type fastener strips placed on either side of the car seat, and holds in place a soft pad, which rests against the child's forehead. The support means prevents the child's head from falling forward or "rolling" to the left or right side while the child is asleep, and holds the child's head in an upright position against the back of the child's car seat. Interaction between the hook and loop fasteners keeps the support strap from falling down around the child's face and neck area.

Figure 1:
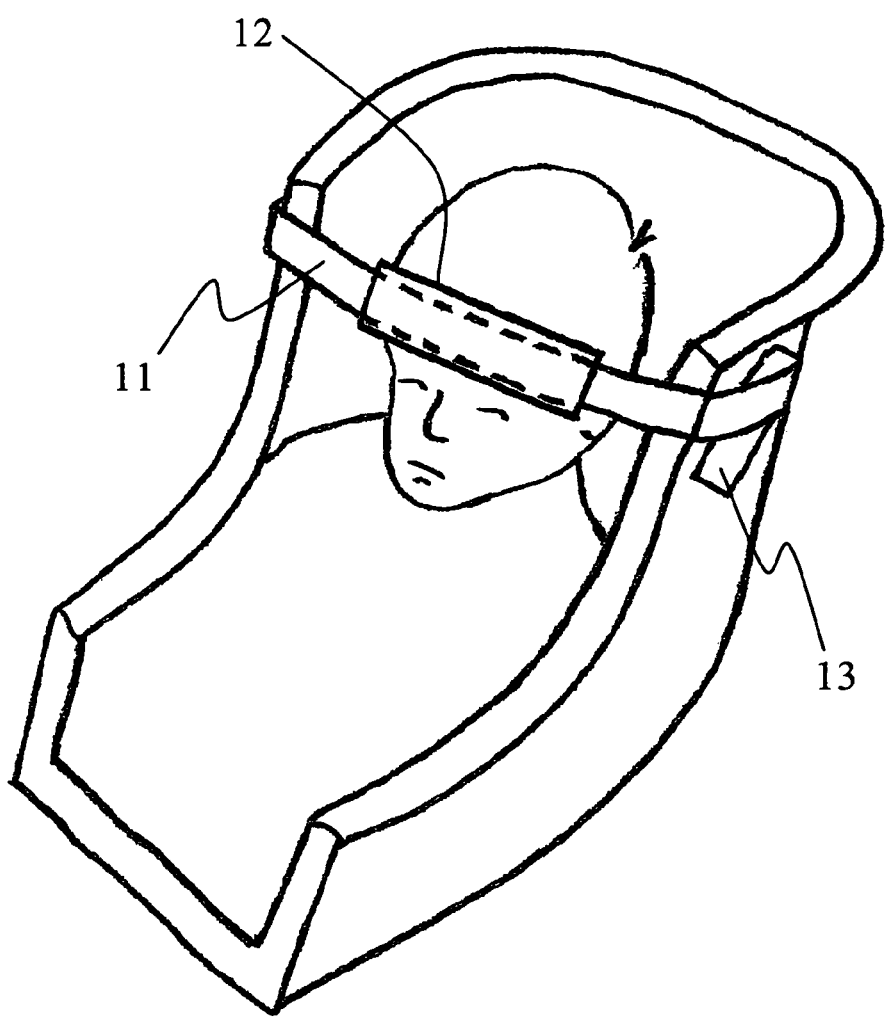
FIG. 1 is a perspective view depicting the baby head sleeping support system while in use.

Referring to FIG. 1, there is shown a perspective view of the head support system. The system comprises an elastic, one-piece support band 11 having a soft head pad 12 that rests against the forehead and gently holds the child's head in an upright position against the back of the car seat. The head pad 12 is tubular in design to allow the support band 11 to pass through it; and the support band 11 is held in place by two hook and loop type fastener strips 13 placed on either side of the car seat. Preferably, the head pad 12 is composed of a cotton-based material.

The hook and loop type fastener strips 13 are positioned on both sides of the car seat preferably in a diagonal orientation, at about a 30-60 degree angle, and preferably at a 45 degree angle, in such a way to allow for maximum adjustability of the head support both in the vertical placement of the support band 11 and also in the relative length of the support band 11 that is used to support the child's head. This provides for the ability (i) to adapt the head support system for children of varying heights and with various size heads; (ii) to adjust the head support as the child grows with age; and (iii) to adjust the relative degree of tension holding the child's head against the back of the car seat. Preferably, the hook and loop type fastener strips are attached to both sides of the car seat with industrial strength glue, suitable for this type of application.

The head pad 12 is made from a cotton-based material, or cotton-blend material. The head pad preferably has a length in the range of 5-20 inches and has a diameter in the range of 1-5 inches. More preferably, the head pad has a length in the range of 10-15 inches and has a diameter in the range of 2-4 inches. Most preferably, the head pad is 12 inches long and has a 2.5 inches diameter. The head pad 12 is tubular in design to allow the support band 11 to pass through it.

The support band 11 is made from an elastic material. The support band preferably has a length in the range of 10-40 inches and has a width in the range of 0.5-5 inches. More preferably, the support band has a length in the range of 20-30 inches and has a width in the range of 1-4 inches. Most preferably, the support band is 28 inches long and 1.5 inches wide. One side of a hook and loop type fastener is preferably sewn in place at each end of the support band, respectively. Each of these sides of hook and loop fasteners has a length in the range of 5-10 inches and a width in the range of 0.25-1.5 inches. Most preferably, each of these sides of hook and loop type fastener is 7 inches long and 0.75 inches wide.

Each strip of hook and loop type fastener which is attached to the two sides of the car seat, respectively, preferably has a length in the range of 3-10 inches and a width in the range of 0.5-5 inches. More preferably, each strip of hook and loop type fastener which is attached to the two sides of the car seat, respectively, has a length in the range of 4-8 inches and a width in the range of 1-4 inches. Most preferably, each strip of hook and loop type fastener which is attached to the two sides of the car seat, respectively, is 6 inches long and 2 inches wide. The support band 11 attaches at both of its ends to the hook and loop type fastener portions 13 located on the car seat and runs across the front of the car seat.

The head support system allows the child to sleep comfortably when riding in a vehicle because the support band 11 prevents strain on the neck and spine, which is caused when the child's head falls forward or "rolls" to either the left or right side. The support band 11 keeps the child's head in an upright position against the back of the child's car seat while riding in a vehicle. The head support system provides for continual head support even during the unpredictable forces associated with heavy braking and sharp turns.

In the absence of the head support system, the parents of the child will constantly find themselves gently repositioning the child's head to an upright and more comfortable position. If driving on a highway or other situation where it is unfeasible to pull the vehicle over to the side of the road, parents may be forced to put their own safety at risk by releasing their seatbelt and "climbing" into the back seat while the vehicle is moving in order to reach the child to reposition the child's head. Over the course of a trip, this sort of activity may have to be repeated several times.

The head support system can be detached from the car seat when not in use by separating the hook and loop fasteners 13 at the ends of the support band 11.

Figure 3:
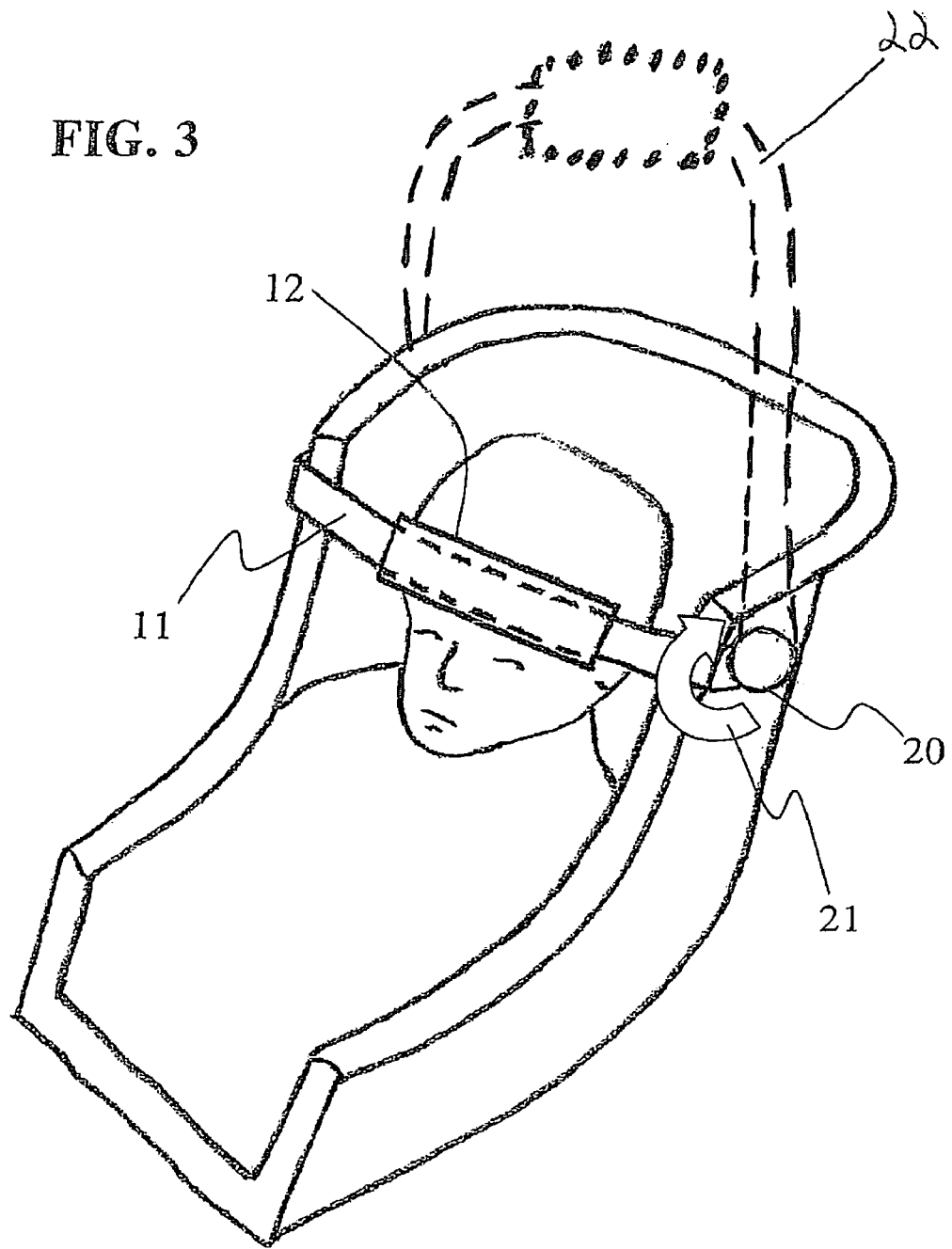
FIG. 3 is a perspective view depicting an embodiment of the baby head sleeping supvort system wherein the hook and loop fasteners are located on rotating discs attached to the car seat.

In an alternative embodiment, shown in FIG. 3, two rotating discs 20 are located at either side of the child car seat and include a hook and loop type fastener on each outer surface of the rotating discs. The support band 11 is attached to the two rotating discs 20 at either side of the car seat with the hook and loop type fastener. Since the rotating discs include a hook and loop type fastener, the support strap may be adjusted for a variety of different sized heads, and the tension of the support strap may also be adjusted by repositioning the location of the strap on the hook and loop type fasteners. By simply rotating the discs, indicated by arrow 21, the support band 11 may be moved to the top of the car seat when the apparatus is not in use, shown at 22. The support band 11 is then positioned around the child's forehead when the child falls asleep by rotating the discs 20 in the appropriate direction.

The head support system of the present invention is comfortable for the child. It may be adjusted to fit different size car seats and different size heads, is easy to install, and is very reliable. Because the present invention has a very simple construction requiring few parts, the head support system can be manufactured at a reasonable cost and is very simple to install and use. The present invention can be sold as a kit which comprises the support band 11, the head pad 12, and the two hook and loop type fasteners 13. The kit includes instructions for using the head support system that comprise the steps of: (i) inserting an elastic, one-piece support band having a first end and a second end into a tubular soft cotton head pad; (ii) attaching a first pair of hook and loop type fasteners, wherein the fasteners are located on first side of the car seat and at the first end of the support band, respectively; (iii) positioning the head pad so that it rests against the child's forehead; and (iv) attaching a second pair of hook and loop type fasteners, wherein the fasteners are located on second side of the car seat and at the second end of the support band, respectively.

In another embodiment of the present invention, the baby head sleeping support system comprises a unit that is adaptable to fit various car seats, carriages, booster seats, and the like. In this embodiment a hook and loop type fastener is not required to be attached to each side of the car seat. Instead, a circular strap is disclosed that is operable for placement over the top of the car seat. The circular strap is held in position by adjusting the tension of the circular strap. It is engaged by friction through the force applied by the elasticity of the support band. The circular strap is assembled from a support band 11a, a head pad 12, and a tension strap 15.

Figure 2:
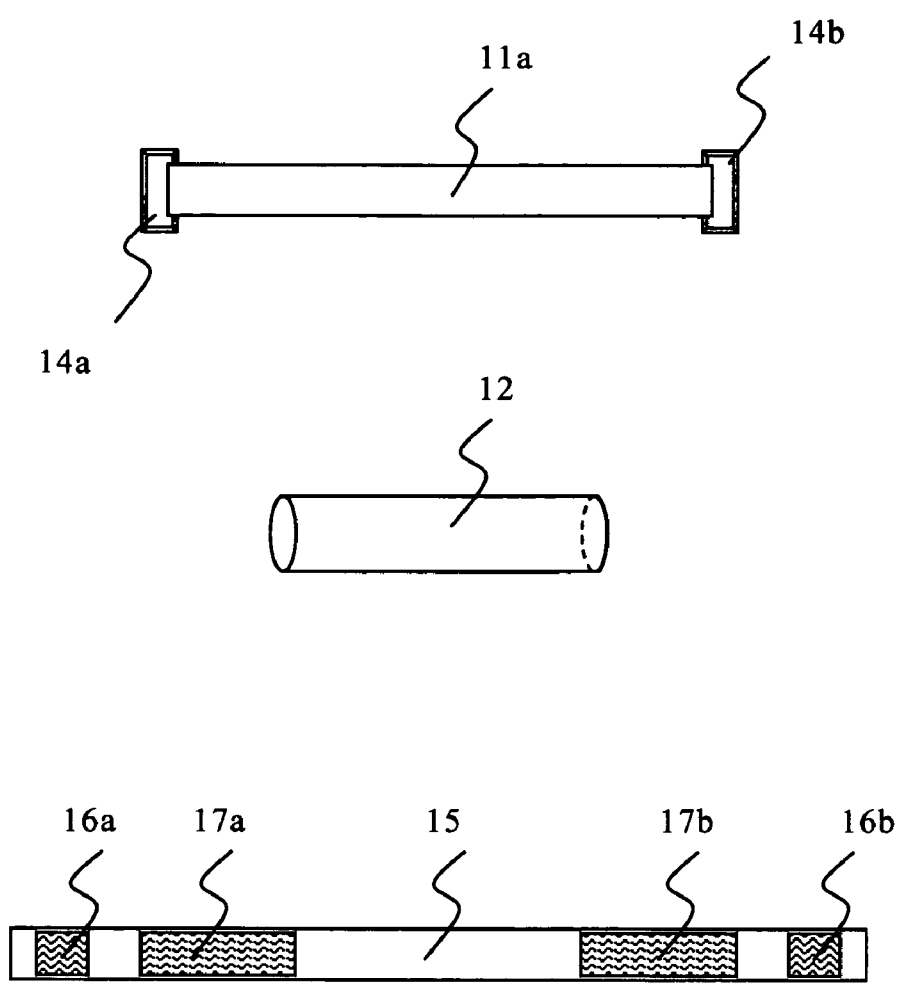
FIG. 2 is a perspective view depicting the respective parts of an alternative embodiment of the present invention, which collectively form a single circular strap when assembled.

FIG. 2 illustrates this embodiment of the invention. An elastic, one piece support band having a first end and a second end is shown at 11a. The support band 11a has two rings, 14a and 14b, attached at each of its ends, respectively. The rings, 14a and 14b, are preferably attached at each end of the support band 11a by having the outermost portion of each of the two ends of the support band, respectively, folded over and sewn onto itself to create a self-enclosed loop, whereby the rings, 14a and 14b, are positioned within each of the two loops. Each of the rings, 14a and 14b, respectively, are preferably the same size and are rectangular in shape. Alternatively the rings are oval-shaped, or the like. The rings may be composed of metal, plastic, or the like.

The present embodiment further comprises a substantially non-elastic tension strap, 15, having a first end and a second end. The tension strap is preferably composed of nylon. One set of fasteners, 16a and 17a, is attached at the first end of the tension strap. Another set of fasteners, 16b and 17b, is attached at the second end of the tension strap. Each of the two opposable elements of each set of fasteners is positioned side-by-side along the length of the tension strap. The outermost portion of each of the ends of the tension strap includes one element, 16a and 16b, respectively, of the fastener set in order to removably attach each of the ends of the tension strap onto itself by folding the outermost end of the strap and attaching element 16a to element 17a, thereby creating a self-enclosed loop. This self-enclosed loop will encompass ring 14a. The same configuration is followed at the second end of the strap with elements 16b and 17b of the second set of fasteners, and ring 14b.

Preferably the two sets of fasteners are hook and loop type, as shown in FIG. 2, with elements 16a and 16b, respectively, being hook elements, and elements 17a and 17b, respectively, being the loop elements. Preferably the two sets of fasteners are attached to the tension strap by permanent stitching. Alternatively, the fasteners are attached with industrial strength glue. Preferably elements 16a and 16b, respectively, are spaced about ¼ to 1 inch from the end of the strap to provide a tab at each end for easy grip by the user's fingers during use. Preferably elements 16a and 16b, respectively, are in the range of about ½ to 3 inches in length. Preferably elements 17a and 17b, respectively, are in the range of about 2 to 6 inches in length. Such a configuration enables maximum adjustability in the overall circumference of the circular strap. Alternatively, the two sets of fasteners are comprised of snaps, set at appropriate intervals to allow for adjustments to the overall circumference of the circular strap. Alternatively, other types of fasteners may be used.

Figure 4:
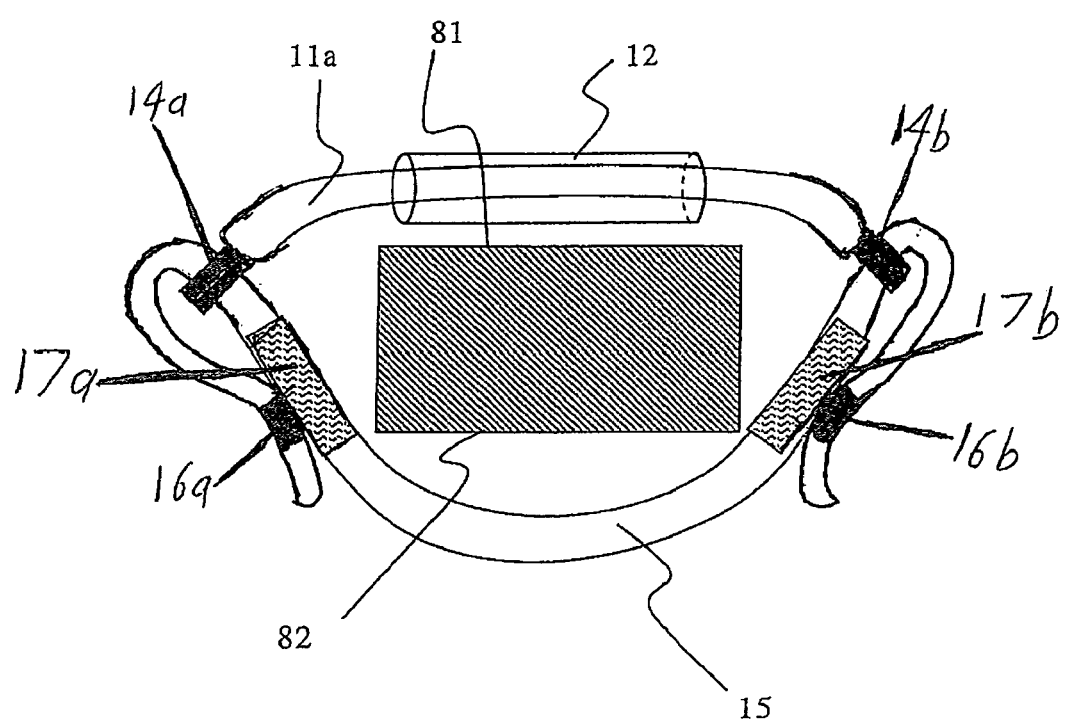
FIG. 4 is a top view depicting the single circular strap of FIG. 2 being attached to the car seat.

During use of the support system, shown at FIG. 4, the substantially non-elastic tension strap, 15, having a first end and a second end, is attached to each end of the support band, 11a. As noted, the support band, 11a, has two rings, 14a and 14b, attached to each of its ends, respectively. The first end of the tension strap is inserted through the ring 14a, whereafter element 16a is removably attached to element 17a, thereby forming a self-enclosed loop joining the first end of the elastic support band to the first end of the substantially non-elastic tension strap. Likewise, the same configuration is followed at the second end of the tension strap, where the second end of the tension strap is inserted through ring 14b. The front of the car seat is shown at 81, and the rear of the car seat is shown at 82.

The present embodiment further comprises a soft head pad, 12, that rests against the child's forehead during use of the support system, wherein the head pad, 12, is tubular in design to allow the support band, 11a, to pass through it. The head pad, 12, is preferably made from a cotton-based material, or cotton blend.

The present embodiment is easily transportable and may be used with various types of car seats, strollers, booster seats, and the like. Because the circular strap includes all the parts required for its use, without the need for attaching a fastener directly to the sides of the car seat, this embodiment of the invention may be used with several different car seats. Alternatively, however, a hook or loop portion of a hook and loop type fastener may be applied to both sides of the car seat (as described hereinabove in reference to the previously disclosed embodiment) to increase the amount of friction existing between the circular strap and the car seat, thereby providing a more stable connection and more reliable support for the child's head.

This embodiment of the invention further includes easy access to the fastener sets to enable adjustments to the tension of the circular strap via either set of fasteners located on each side of the car seat. The present embodiment is lightweight, durable, and very easy to use. The head pad may be removed from the circular strap to allow for laundering, or simply to interchange between several different head pads having various colors and designs, according to the appearance of the child's clothes, the color of the car seat, and the like.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A baby head sleeping support system in combination with a child car seat, comprising;
    a. an elastic, one-piece support band having a first end and a second end;
    b. a soft head pad composed of a cotton-based material that rests against said child's forehead during use of said support system, said head pad being of tubular design and having a continuous cross-sectional surface area to allow said support band to pass through it;
    c. two sets of hook and loop type fasteners, said fasteners being placed on either side of said car seat and at said ends of said support band, respectively; and
    d. two rotating discs located on either side of said car seat, said rotating discs having outward facing surfaces, wherein said hook and loop type fasteners are located on said surface of each of said rotating discs, said rotating discs providing means for rotating said support band up and above said car seat when said baby head sleeping support system is not in use,
wherein said support band is passed through said head pad, and said support band is attached to said car seat with said fasteners to support said child's head in an upright position against the back of said car seat.

2. The baby head sleeping support system recited in claim 1, wherein said hook and loop type fasteners are placed on either side of said car seat at an angle of about 30 to 60 degrees.

3. The baby head sleeping support system recited in claim 1, wherein said hook and loop type fasteners are placed on either side of said car seat at an angle of about 45 degrees, thereby allowing for maximum adjustability of said support band.

4. The baby head sleeping support system recited in claim 1, wherein said hook and loop type fasteners attached to said car seat have a length in the range of 3-10 inches and have a width in the range of 0.5-5 inches.

5. The baby head sleeping support system recited in claim 1, wherein said hook and loop type fasteners attached to said car seat have a length ranging from about 4-8 inches and a width ranging from about 1-4 inches.

6. The baby head sleeping support system recited in claim 1, wherein said hook and loop type fasteners attached to said car seat are 6 inches long and 2 inches wide.

7. A baby head sleeping support system in combination with a child car seat, comprising;
    a. an elastic, one-piece support band having a first end and a second end;
    b. a soft cotton based head pad that rests against said child's forehead during use of said support system, said head pad being tubular in design to allow said support band to pass through it;
    c. a substantially non-elastic tension strap having a first end and a second end;
    d. a first ring at said first end of support band, for attaching said support band's first end to said strap's first end;
    e. a second ring at said second end of support band, for attaching said support band's second end to said strap's second end;
    f. two sets of fasteners, said fasteners being placed on either end of said tension strap, respectively, such that each of said ends are operable for insertion through each of said rings, respectively, whereafter each end is folded onto itself, creating a removable attachment of each of said support band's first and second ends, respectively, to each of said tension strap's first and second ends, respectively; and g. said two sets of fasteners are hook and loop type fasteners having substantial overlap to enable length of said circular strap to be adjusted;

wherein said support band is passed through said head pad, said support band's first end is removably attached to said tension strap's first end, said support band's second end is removably attached to said tension strap's second end, thereby forming a single circular strap having a circumference, wherein said circular strap is operable for placement over said car seat and is tightened against said car seat with said fasteners so that said head pad rests against said child's forehead, said support band being held in place through friction in order to support said child's head in an upright position against the back of said car seat.

8. The baby head sleeping support system recited in claim 7, wherein said substantially non-elastic tension strap is composed of a nylon-based material.

9. The baby head sleeping support system recited in claim 7, wherein said first and second rings, respectively, are substantially rectangular in shape.

10. The baby head sleeping support system recited in claim 7, wherein said first and second rings, respectively, are oval-shaped.

11. The baby head sleeping support system recited in claim 7, wherein a strip of hook or loop portion of a hook and loop type fastener is attached to each side of said car seat, further enhancing said friction existing between said circular strap and said car seat.

* * * * *